United States Patent [19]

Tairaka et al.

[11] Patent Number: 5,112,876
[45] Date of Patent: May 12, 1992

[54] POLYETHER POLYOL AND RIGID POLYURETHANE FOAM

[75] Inventors: Yoshihiko Tairaka, Sakai; Katsumi Inaoka, Osaka, both of Japan

[73] Assignee: Takeda Chemical Industries, Ltd., Osaka, Japan

[21] Appl. No.: 426,226

[22] Filed: Oct. 25, 1989

[30] Foreign Application Priority Data

Oct. 28, 1988 [JP] Japan .................. 63-274145

[51] Int. Cl.$^5$ .................. C08G 18/14; C08G 18/32
[52] U.S. Cl. .................. 521/167; 521/99; 521/101; 521/120; 521/137; 521/172; 528/78
[58] Field of Search .......... 521/167, 137, 101, 120, 521/122, 123, 136, 99, 101, 164, 172; 282/182.25, 182.26; 528/78

[56] References Cited

U.S. PATENT DOCUMENTS 4,243,755 1/1981 Marx et al. .................. 521/137
4,588,803 5/1986 Christmon .................. 528/78

Primary Examiner—John Kight, III
Assistant Examiner—Duc Truong
Attorney, Agent, or Firm—Wenderoth, Lind & Ponack

[57] ABSTRACT

The present invention relates to a polyether polyol which is prepared by (i) reacting 3.0 to 4.0 molecular equivalents of ethylene oxide with one molecular equivalent of 2,3- or 3,4-tolylenediamine, or a mixture thereof in the absense of catalyst, and thereafter, (ii) reacting 2.8 to 4.8 molecular equivalents of propylene oxide with one molecular equivalent of the reaction product in the presence of an alkali metal hydroxide in an amount of not more than 0.8% by weight based on the 2,3- or 3,4-tolylenediamine, or the mixture thereof.

The present invention also relates to a rigid polyurethane foam which is prepared by reacting a polyol mixture containing not less than 50 wt % of the above-mentioned polyether polyol with an isocyanate. The rigid polyurethane foam is obtained with reduced fron requirements.

5 Claims, 1 Drawing Sheet

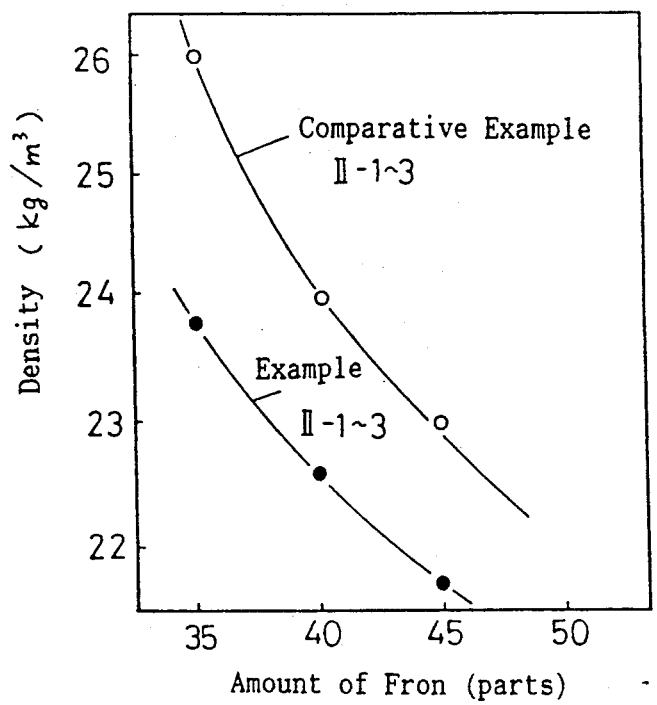
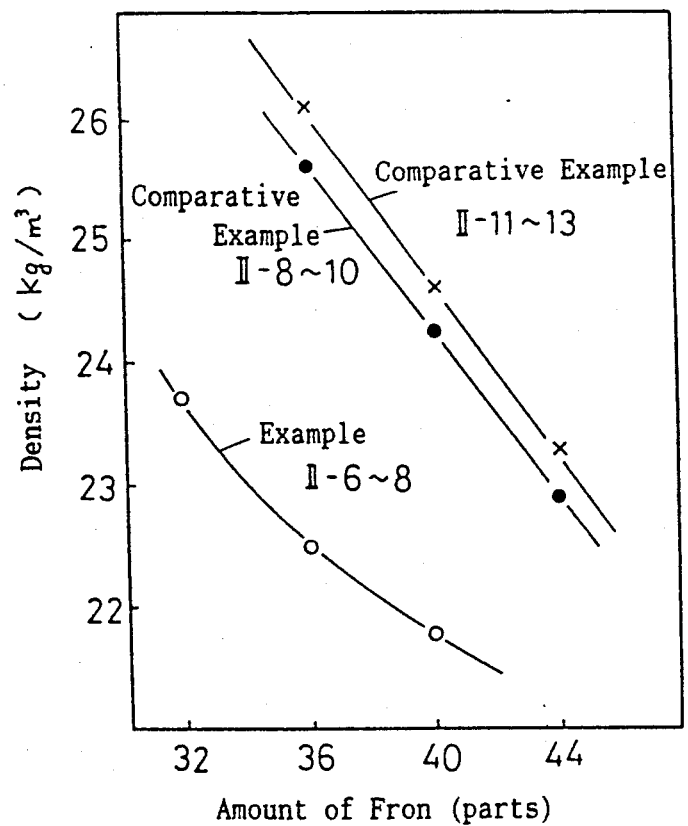

POLYETHER POLYOL AND RIGID POLYURETHANE FOAM

FIELD OF THE INVENTION

The present invention relates to a polyether polyol and a rigid polyurethane foam with reduced fron requirements.

BACKGROUND OF THE INVENTION

Rigid polyurethane foam is not only an effective insulation material but also excels in moldability and processability so that it has been used in a broad spectrum of applications including the heat insulation of electric refrigerators, buildings, low-temperature warehouses or storage tanks, refrigerator boats, piping and so on.

The common production technology for such rigid polyurethane foam is the so-called one-shot process which comprises admixing and reacting a component A mainly comprising a polyol, catalyst, foam stabilizer and foaming agent with a component B which is based on an isocyanate wherein the foaming and curing processes take place concurrently.

The foaming agent used most commonly in the production of polyurethane foam is fron-11 (or fron-12: the froth method). Since water reacts with an isocyanate to give rise to $CO_2$, it is frequently used as a chemical foaming agent in combination with fron-11.

However, the fron gas heretofore used as a foaming agent is so stable chemically that it diffuses to the stratosphere where it destroys the ozone layer. As a consequence, the ultraviolet rays radiated from the sun are not absorbed by the ozone layer but reach the surface of the earth, thus causing serious environmental problems such as an increasing incidence of skin cancer. Under the circumstances, control over the use of fron has been scheduled to come into effect in 1989. Fron-11 for polyurethane is also subject to this control.

Therefore, much exploration has been undertaken for finding a substitute urethane foaming agent but no adequate substitute for fron-11 has been discovered as yet. So far, fron-123, 141b, etc. have been proposed as possible substitutes for fron-11 but none have been implemented on a commercial production scale. Thus, no method is available for economizing the use of fron.

To meet the above requirement of great social implication, the inventors of the present invention conducted intensive studies on urethane foams based on various polyethers prepared by adding alkylene oxides to tolylenediamine and found that the fron requirements in the production of polyurethane foam can be decreased by starting with a polyol meeting certain process and structural characteristics.

Thus, analysis of the intracellular gas composition of a urethane foam revealed the presence of carbon dioxide gas even when water had not been used in the foaming process (since the rigid foam has a closed cell structure, substitution of the intercellular gas with atmospheric air does not easily take place so that the intracellular gas composition is generally equal to the composition of the foaming agent). Of course, the presence of some water (not more than 0.1%) is inevitable even when water is not positively added to the foaming material but the amount of $CO_2$ actually detected was by far over the theoretical amount of $CO_2$ that would be derived from such water. Therefore, it was presumed that some side reaction giving rise to $CO_2$ had taken place in the course of foaming, although the mechanism of such reaction remains to be elucidated.

Surprisingly, further research revealed that this by-product $CO_2$ acted as a foaming or blowing agent (which acts in parallel with curing reaction) and the amount of such evolution of $CO_2$ could be markedly increased by using a polyol having a certain specific structure.

The above-mentioned polyethers obtainable by reacting tolylenediamines with alkylene oxides and various mixtures of such polyethers are already known from British Patent No. 972772 and other literature. The polyols prepared using 2,3/3,4-tolylenediamines (orthotolylenediamines; hereinafter referred to sometimes as OTD) have been described in Japanese Patent Publication No. 32597/1973 and other literature. Moreover, some of the polyethers obtainable by adding ethylene oxide (EO) or propylene oxide (PO) to OTD in certain ratios, as well as mixtures of such polyethers, are also known from Japanese Patent Publication No. 8676/1976, U.S. Pat. No. 4,562,290, Japanese laid-open Patent Application KOKAI No. 134109/1983 and other literature. Regarding OTD and 2,4 or 2,6-tolylenediamine (hereinafter referred to as TDA), some pertinent disclosures can be found in Japanese laid-open Patent Application KOKAI No. 139120/1982, Japanese Patent Publications No. 5935/1987 and No. 32327/1981, Japanese laid-open Patent Application KOKAI No. 1196/1985 and other literature.

However, the above publications are generally addressed to improvement of the characteristics of polyols and the physical properties of the product foams, such as improvements in rheology, surface friability, heat insulation property, wet heat degradation, etc. and do not even allude to the technological innovation of controlling the form of addition of EO or PO to tolylenediamine by specifying the timing or the amount of addition of a catalyst and limiting the amount of addition of EO or PO in the production of a polyether, and to the possibility of reducing fron requirements by using a polyol prepared by the above technical innovation. U.S. Pat. No. 4,562,290 discloses alkyene oxide adducts of vicinal tolylenediamine which is prepared by specifying the timing of addition of a catalyst, and limiting the amount of the catalyst (at least 1.0 part), EO and PO. The literature also has no disclosure relating to reducing fron requirements. Therefore, none of the working and control examples in the published literature relating to the production of urethane foams from various polyols show a prominent density-reducing effect comparable to that of the present invention.

It is, therefore, an object of the present invention to provide a rigid polyurethane foam obtained from a polyether and an isocyanate with reduced fron requirements.

It is another object of the invention to provide a polyether polyol suited to production of the first-mentioned polyurethane foam.

SUMMARY OF THE INVENTION

The present invention relates, in one aspect, to a polyether polyol which is prepared by (i) reacting 3.0 to 4.0 molecular equivalents of ethylene oxide with one molecular equivalent of 2,3- or 3,4-tolylenediamine, or a mixture thereof in the absence of catalyst, and thereafter, (ii) reacting 2.8 to 4.8 molecular equivalents of propylene oxide with one molecular equivalent of the reaction product of (i) in the presence of an alkali metal hydroxide in an amount of not more than 0.8% by weight based on the 2,3- or 3,4-tolylenediamine, or the mixture thereof.

The present invention relates, in another aspect, to a rigid polyurethane foam which is prepared by reacting a polyolmixture containing (a) not less than 50% by weight of the above-mentioned polyether polyol having a hydroxyl value of 390 to 530 mgKOH/g, and
(b) 0 to 50% by weight of polyol having two to eight hydroxyl groups, with an isocyanate in the presence of a foaming agent, foam stabilizer and catalyst.

BRIEF DESCRIPTION OF THE DRAWINGS

FIGS. 1 and 2 are diagrammatic representations each showing the relation between the amount of fron used as a foaming agent and the density of polyurethane foam.

DETAILED DESCRIPTION OF THE INVENTION

The present invention is described in detail hereinafter.

(i) Polyether Polyol

The polyether polyol of the invention is prepared by reacting tolylenediamine first with ethylene oxide and then with propylene oxide in certain proportions, respectively.

The tolylenediamine to be employed in the invention may be 2,3-tolylenediamine, 3,4-tolylenediamine or a mixture thereof. To such an ortho-tolylenediamine (hereinafter referred to sometimes as OTD), ethylene oxide (hereinafter referred to sometimes as EO) is first added in the absence of a catalyst. The EO addition reaction can be conducted by the procedure known per se using a theoretical amount, i.e. 3.0 to 4.0 molecular equivalents, of EO per mole of OTD. If the addition level of EO is less than 3.0 molecular equivalents, the amount of the foaming agent necessary for the formation of a urethane foam cannot be sufficiently reduced and, hence, the objects of the invention cannot be accomplished. On the other hand, the use of an excess of EO over 4.0 molecular equivalents results in the formation of EO-EO bonds and leaves reduced room for addition of PO.

Then, propylene oxide (hereinafter referred to sometimes as PO) is added to the OTD-EO adduct in the per se conventional manner using an alkali metal hydroxide as a catalyst. While the alkali metal hydroxide may be any of the catalysts known to be useful for this purpose, such as potassium hydroxide, sodium hydroxide, etc., the use of flakes of potassium hydroxide or an aqueous solution thereof is particularly advantageous. The amount of such catalyst is not greater than 0.8 percent by weight of the tolylenediamine from the standpoint of the hydroxyl value and viscosity of the polyol.

The level of addition of propylene oxide should be such that the hydroxyl value of the resulting polyether polyol will be in the range of 390 to 530 mgKOH/g. If the level of addition of propylene oxide is too high, that is to say the hydroxyl value of the product polyol is less than 390 mgKOH/g, the effect of reducing the amount of fron necessary for the production of a urethane foam will not be fully materialized. On the other hand, if the level of addition of propylene oxide is too low and, hence, the hydroxyl value of the polyol exceeds 530 mgKOH/g, the number of EO-derived terminal primary hydroxyl groups will be so large that the reaction with the isocyanate will proceed too rapidly to control in practical application. Thus, the secondary expansion of the urethane foam will be so great as to interfere with the curing reaction. Moreover, the reaction is retarded to the extent that scorching is liable to occur. Furthermore, the viscosity of the polyol is also increased markedly to detract from the ease of handling.

From the above considerations, the level of addition of propylene oxide is controlled within the range of 2.8 to 4.8 molecular equivalents.

Thus, in the production process for polyols according to the present invention, both the timing of addition of the catalyst and the amounts of addition of EO and PO in moles are controlled. It is thought that the structure of the product polyether polyol is dependent a great deal on these conditions. The relation between the timing of addition of the catalyst and the characteristics of the product polyol was investigated. The findings are shown below in the test example.

Test Example (The Timing Of Addition Of The Catalyst Vs. The Product Polyol)

(i) A four-necked 5-liter flask fitted with a stirrer, condenser, thermometer and alkylene oxide inlet means was charged with 1,220 g of OTD and 15 g of KOH flakes, followed by introduction of 920 g of ethylene oxide for addition reaction. Then, 1800 g of propylene oxide was added and reacted. The reaction mixture was neutralized with oxalic acid, filtered and dehydrated to give a polyol (CF-1). The levels of addition of EO and PO to each mole of OTD were 2.1 moles and 3.1 moles, respectively.

The same equipment as used in (i) was charged with 1220 g of OTD and 900 g of EO for addition reaction. After addition of 15 g of KOH flakes, 1850 g of PO was introduced for PO addition reaction. Thereafter, the reaction mixture was worked up as in (i) to give a polyol (CF-2).

(iii) The procedure of (ii) was repeated except that the amount of KOH was changed to 7.5 g to give a polyol (CF-3).

Although polyols CF-1 through -3 were substantially identical in OTD/EO/PO ratio, their properties varied considerably as shown below in the table, suggesting that they are quite divergent in structure. It is, thus, clear that the timing and amount of addition of the catalyst exert a remarkable influence on the mode of EO/PO addition.

TABLE 1

| Polyol | Hydroxyl value found (mgKOH/g) | Viscosity (cps) |
|---|---|---|
| CF-1 | 404 | 860 |
| CF-2 | 471 | 22,800 |
| CF-3 | 477 | 57,200 |

Thus, as apparent from its the general formula,

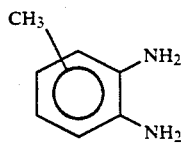

OTD has NH₂ groups in ortho-positions and when EO or PO is added, the third and fourth EO or PO molecules can hardly add themselves to OTD because of steric hindrance. While potassium hydroxide and other catalysts used generally promote the addition reaction between —OH group and alkylene oxide, they are indifferent to the reaction between —NH₂ and alkylene oxide. Therefore, if KOH is added at the beginning of EO addition, the reaction adding EO to the EO previously added to tolylenediamine predominates so that when 3 to 4 molecular equivalents of EO is used per mole of OTD, the number of EO molecules added directly to OTD is decreased.

It is generally considered that a catalyst controls the reaction rate only and does not influence the reaction product. However, the production of a polyol using OTD as a starting material involves a competitive reaction between the addition of alkylene oxide to —NH₂ and the addition of alkylene oxide to —OH and, moreover, the steric hindrance in the neighborhood of the reaction site is substantial. This is apparently the reason why a variation in the timing and amount of addition of the catalyst results in a marked variation in structure of the product polyol as evidenced by the above test example.

As the catalyst for polyol synthesis, not only the alkali metal hydroxide to be used in the invention but also various salts disclosed in Japanese laid-open Patent Application No. 1196/1975 and amine catalysts described in Examples of Japanese Patent Publication No. 8676/1976 are known. However, the catalysts other than alkali metal hydroxides are not much useful for commercial production and among alkali metal hydroxides, potassium hydroxide is the most desirable. Thus, with an amine catalyst, it is difficult to obtain a satisfactory low-density polyurethane foam, for as the process does not include a neutralization-purification step, impurities such as the unreacted PO and the isomer of PO find their way into the product so that scorching and roughening of cells tend to take place and/or the percentage of closed cells is decreased.

(ii) The Other Polyol

The above-mentioned other polyol containing 2 to 8 hydroxyl groups which can be used in combination with the polyether polyol of the invention may be any of the known polyols which are reacted with isocyanates to give polyurethanes. Thus, for example, the polyol derived from sucrose-glycerol (Actcol GR-84, Takeda Chemical Industries, Ltd.), the polyol derived from glycerol, the polyol prepared from ethylenediamine, and the polyols based on aromatic amines can be mentioned.

It may also be a polyester polyol (for example, APP-315, manufactured by UCC) or a phosphorus-containing polyol (for example, Fyrol-6, manufactured by Akzo).

The polyol mixture which can be used in accordance with the present invention is not limited to a blend of two or more dissimilar polyols but may be a polyol mixture which can be obtained by using other starting materials along with OTD in conducting the addition reaction of EO/PO to OTD so that the addition reaction of EO/PO to such other starting materials will occur concurrently with the addition of EO/PO to OTD.

The proportion of the OTD-based polyol in such a polyol mixture should not be less than 50 percent by weight. If the proportion of the OTD polyol is less than 50 percent by weight, the fron-conserving effect will not be sufficient.

The hydroxyl value of the polyol mixture is preferably in the range of 380 to 650 mgKOH/g. If the hydroxyl value is less than 380 mgKOH/g, the product rigid foam will not be adequate in strength and dimensional stability. On the other hand, if the hydroxyl value exceeds 650 mgKOH/g, the urethane foam will be too fragile.

For the production of a rigid polyurethane foam from said polyol or polyol mixture, the polyol or polyol mixture is reacted with an isocyanate compound in the presence of a foaming agent, foam stabilizer and catalyst by the per se known method.

In conducting the foaming reaction, various known additives such as flame retardants such as trichloroethyl phosphate, trichloropropyl phosphate, etc., colorants such as toners, etc. can be added.

(iii) Isocyanate

The isocyanate to be used in the production of a urethane foam according to the present invention may be any of crude MDI, crude TDI, TDI prepolymer and mixtures thereof. TDI-80 may also be contained in a minor proportion. However, from the standpoint of reactivity, aliphatic isocyanates such as isophorone diisocyanate (IPDI) are not suitable. The proportion of the isocyanate is substantially the same as used in the production of the conventional rigid polyurethane foam and preferably has an NCO/OH ratio of about 0.9 to 1.5.

(iv) Foam Stabilizer

As the foam stabilizer, any of the cell-size regulators for rigid foams, which are commercially available, can be employed. For example, B-8404, B-8407 and B-8425 (Goldschmidt), F-305, F-345 and F-373 (Shin-Etsu Chemical), SH-193 (Toray Silicone), and L-5420, L-5430 and L-5350 (Nippon Unicar) may be mentioned. There is no production problem even if a more active silicone for flexible foams, such as B-8017, is used in lieu of said silicone for rigid foams. The proportion of the foam stabilizer may be the same as used commonly in the art and may for example be 0.5 to 5.0 parts to each 100 parts of the polyol.

(v) Catalyst

The urethanation catalyst may be any of the known amine catalysts, tin catalysts and combinations thereof, such as tetramethylhexanediamine, triethylenediamine, dimethylcyclohexylamine and so on. It may be a catalyst of more complex structure, such as DBU.

(vi) Foaming Agent

As the foaming agent, fron-11 is generally employed. It is preferable that as a chemical foaming agent, water which liberates $CO_2$ is present in the reaction system. Assuming that the density of polyurethane foam is constant, the use of water results in smaller fron-11 requirements, thus contributing more to accomplishment of the objects of the invention, and furthermore promotes the byproduction of $CO_2$. However, if the amount of water is too great, the foam may become fragile. Other frons such as fron-123, fron-141b, etc. or dibromodifluoromethane and the like may be used concomitantly. The preferred proportion of water is 1.0 to 3.0 parts to each 100 parts of polyol.

The free foaming density of the product urethane foam is preferably in the range of 20 to 36 kg/m$^3$. If the density is too low, the foam strength will not be fully satisfactory as is the case with the conventional rigid polyurethane foam, while an excessively high density tends to cause scorching due to a side reaction.

The polyol of the present invention can reduce the amount of fron required for the production of a rigid polyurethane foam by 10 to 30 percent.

EXAMPLES

The following examples, comparative examples and reference example are further illustrative of the invention.

(I) PRODUCTION OF POLYOL

Example I-1

A 70-liter reactor equipped with heater and agitator means was charged with 12.2 kg (100 moles) of OTD and 17.6 kg (400 moles) of EO and the reaction was carried out at 100°–110° C. After 120 g. of a 50% aqueous solution of KOH was added, 26.1 kg (450 moles) of PO was introduced and reacted at 100°–110° C. After 2 hours of aging, the small residual amount of unreacted PO was stripped off and, then, the KOH was neutralized with an aqueous solution of 60 g of oxalic acid. The resultant potassium oxalate was filtered off and the filtrate was dehydrated. Then, as a stabilizer, 500 ppm of 2,6-ditert-butyl-4-methylphenol (BHT) was added. The resulting polyether polyol had a hydroxyl value of 408 mgKOH/g and a viscosity of 11,000 cps (at 25° C.). By the above procedure, 4 moles of EO and 4.5 moles of PO were added to each mole of OTD. The amount of the catalyst was 0.49% based on OTD.

Comparative Example I-1

The same reactor as used in Example I-1 was charged with 12.2 kg of OTD, followed by introduction of 9.68 kg of EO. After this addition reaction, 400 g of an aqueous solution of KOH was added and 29 kg of PO was introduced and reacted at 100°–110° C. As in Example I-1, the reaction mixture was neutralized with oxalic acid, filtered and dehydrated, followed by addition of BHT to give a polyol. This polyol had a hydroxyl value of 403 mgKOH/g and a viscosity of 6,100 cps (25° C.). The levels of addition of EO and PO wee 2.2 moles and 5.0 moles, respectively, and the amount of the catalyst was 1.6% based on OTD.

Comparative Example I-2

Using the same reactor as used in Example I-1, 12.2 kg of OTD was reacted with 12.8 kg of PO in the absence of a catalyst. After addition of 400 g of aqueous KOH solution, 20.9 kg of PO was introduced and reacted. After 2 hours of aging, 4.9 kg of EO was added and, thereafter, the reaction mixture was neutralized and purified in the same manner in Example I-1. The resulting polyol had a hydroxyl value of 407 mgKOH/g and a viscosity of 15,300 cps (25° C.). The level of direct addition of EO to OTD was 0 mole. The levels of addition of PO and EO were 5.8 moles and 1.1 moles, respectively.

Example I-2

The same reactor as used in Example I-1 was charged with 12.2 kg of OTD followed by introduction of 17.6 kg of EO, and the reaction was conducted in the absence of a catalyst. Then, 3.1 kg of triethanolamine and 160 g of 50% aqueous KOH were added and 22 kg of PO was introduced and reacted. The reaction mixture was then neutralized and purified in the same manner as in Example I-1 to give a polyol having a hydroxyl value of 468 mgKOH/g and a viscosity of 8,900 cps (25° C.). The levels of addition of EO and PO to the OTD moiety of this polyol were 4 moles and 3.1 moles, respectively, per mole of OTD.

Comparative Example I-3

A polyol was prepared by the same procedure as Example I-2 except that 2,4-, 2,6-tolylenediamine was used in lieu of OTD. The resulting polyol had a hydroxyl value of 465 mgKOH/g and a viscosity of 9,500 cps (25° C.).

Example I-3

The same reactor as used in Example I-1 was charged with 12.2 kg of OTD followed by introduction of 14.1 kg of EO, and the addition reaction was conducted in the absence of a catalyst. After addition of 130 g of 50% aqueous KOH and 6.0 kg of triethanolamine, 24.3 kg of PO was introduced and reacted. The reaction mixture was then neutralized and purified to give a polyol.

This polyol had a hydroxyl value of 510 mgKOH/g and a viscosity of 8,700 cps (25° C). The levels of addition of EO and PO to OTD were 3.2 moles and 3.1 moles, respectively.

Comparative Example I-4

The same reactor as used in Example I-1 was charged with 12.2 kg of OTD followed by introduction of 18.5 kg of EO and the addition reaction was conducted in the absence of a catalyst. After addition of 130 g of 50% aqueous KOH and 8.7 kg of PO, the reaction mixture was neutralized and purified to give a polyether polyol. This polyol had a hydroxyl value of 535 and a viscosity of 36,000 (25° C.). The levels of addition of EO and PO were 4.2 moles and 1.5 moles, respectively, based on each mole of OTD.

(II) PRODUCTION OF RIGID POLYURETHANE FOAM

Using the polyols prepared in the above Examples and Comparative Examples, rigid polyurethane foams were produced by the hand-mixing method under free foaming conditions. Thus, 200 to 300 g of each of the polyols was pre-blended with a foam regulator, catalyst, foaming agent and other additives and the liquid temperature was maintained at 20°±1° C. Then, the necessary amount of the isocyanate maintained at 20°±1° C. was added to the polyol premix and the mixture was immediately stirred on a turbine mixer (1,600 rpm) for 3 to 5 seconds. This mixture was poured into a box (25 cm×25 cm×25 cm) with an open top to produce a polyurethane foam.

Examples II-1 Through 3 And Comparative Examples II-1 Through 3

Using the polyols prepared in Example I-1 and Comparative Example I-1, urethane foams were produced according to the formulas shown in Table 2.

TABLE 2

|  | Examples | | | Comparative Examples | | |
|---|---|---|---|---|---|---|
|  | II-1 | II-2 | II-3 | II-1 | II-2 | II-3 |
| Component (parts) | | | | | | |
| Polyol of Example I-1 | 100 | 100 | 100 | | | |
| Polyol of Comparative Example I-1 | | | | 100 | 100 | 100 |
| Silicone B-8404[1)] | 1.5 | 1.5 | 1.5 | 1.5 | 1.5 | 1.5 |
| Kaolizer No. 1[2)] | 2.0 | 2.2 | 2.2 | 1.5 | 1.5 | 1.5 |
| Fron-11 | 35 | 40 | 45 | 35 | 40 | 45 |
| $H_2O$ | 1.5 | 1.5 | 1.5 | 1.5 | 1.5 | 1.5 |
| Millionate MR-200[3)] | 132 | 132 | 132 | 132 | 132 | 132 |
| Reactivity | | | | | | |
| Cream time (seconds) | 13 | 11 | 12 | 5 | 6 | 6 |
| Gel time (seconds) | 53 | 52 | 56 | 51 | 55 | 62 |
| Physical properties | | | | | | |
| Density (kg/m$^3$) | 23.8 | 22.6 | 21.7 | 26.0 | 24.2 | 23.0 |
| Dimensional change (−30° × 48 hr) | −3.8% | shrinkage | shrinkage | −6.7% | shrinkage | shrinkage |
| Compressive strength (foaming direction, kg/cm$^2$) | 1.91 | 1.65 | 1.53 | 2.03 | 1.60 | 1.37 |
| Thermal conductivity (kcal/m · hr · °C.) | 0.0157 | 0.0150 | 0.0149 | 0.0136 | 0.0137 | 0.0137 |

Note)
[1)]A silicone manufactured by Th. Goldschmidt Japan Co., Ltd.
[2)]An amine catalyst manufactured by Kao Corporation
[3)]Manufactured by Nippon Polyurethane Industry Co., Ltd.

The relation between the amount of fron used as a foaming agent and the density of product polyurethane foam is shown in FIG. 1. It will be apparent from FIG. 1 that, assuming the production of polyurethane foams of the same density, the use of the polyol of Example I-1 results in a conservation of about 7 parts of fron as compared with the use of the polyol of Comparative Example I-1 (which is equivalent to a conservation of 15 to 20%).

Furthermore, when the polyol of Example I-1 is employed, the resulting foam is superior in physical properties with improved dimensional stability at the same density.

Examples II-4 and 5, And Comparative Examples II-4 Through 7

According to the formulas shown in Table 3, polyurethane foams were produced without the concomitant use of water as a chemical foaming agent. The results are also shown in Table 3.

The polyurethane foams of Examples II-4 and 5 are less dense than those of Comparative Examples II-4 through 7 by 1.2 to 1.5 kg/m$^3$. Thus, when fron alone is used as a sole foaming agent to change the reactivity, the polyol of Example I-1 is definitely superior in reducing the foaming agent requirements.

TABLE 3

|  | Examples | | Comparative Examples | | | |
|---|---|---|---|---|---|---|
|  | II-4 | II-5 | II-4 | II-5 | II-6 | II-7 |
| Component (parts) | | | | | | |
| Polyol of Example I-1 | 100 | 100 | | | | |
| Polyol of Comparative Example I-1 | | | 100 | 100 | | |
| Polyol of Comparative Example I-2 | | | | | 100 | 100 |
| Silicone TY-16[4)] | 1.5 | 1.5 | 1.5 | 1.5 | 1.5 | 1.5 |
| Fron-11 | 43 | 43 | 43 | 43 | 43 | 43 |
| Toyocat TS-20[5)] | 3.2 | 4.0 | 1.8 | 2.4 | 0.65 | 1.0 |
| Millionate MR-200 | 106 | 106 | 106 | 106 | 106 | 106 |
| Foam density (kg/m$^3$) | 26.0 | 25.5 | 27.0 | 26.7 | 27.5 | 27.3 |

Note)
[4)]A silicone manufactured by Nippon Unicar Co., Ltd.
[5)]A compound amine catalyst manufactured by Tosoh Corporation

Examples II-6 Through 8 And Comparative Examples II-8 Through 13

Using the polyol of Example I-2, the polyol of Comparative Example I-3 (meta-TDA) and a commercial polyol, urethane foams were produced in the same manner as above. The results are shown in Table 4. The relation between the amount of fron and the density of urethane foam is shown in FIG. 2.

It is apparent from FIG. 2 that compared with the use of the commercial polyol, the use of the polyol of Example I-2 results in a conservation of about 10 to 15 parts of fron, that is a marked decrease of fron requirements amounting to 20 to 40%.

TABLE 4

|  | Examples | | | Comparative Examples | | | | | |
|---|---|---|---|---|---|---|---|---|---|
|  | II-6 | II-7 | II-8 | II-8 | II-9 | II-10 | II-11 | II-12 | II-13 |
| Component (parts) | | | | | | | | | |
| Polyol of Example I-2 | 100 | 100 | 100 | | | | | | |
| Polyol of Comparative Example I-3 | | | | 100 | 100 | 100 | | | |
| Actcol GR-84[6)] | | | | | | | 100 | 100 | 100 |
| Silicone B-8404 | 1.5 | 1.5 | 1.5 | 1.5 | 1.5 | 1.5 | 1.5 | 1.5 | 1.5 |
| Kaolizer No. 1 | 0.4 | 0.5 | 0.55 | 1.3 | 1.5 | 1.5 | 3.6 | 4.0 | 4.0 |
| $H_2O$ | 1.5 | 1.5 | 1.5 | 1.5 | 1.5 | 1.5 | 1.5 | 1.5 | 1.5 |

TABLE 4-continued

|  | Examples | | | Comparative Examples | | | | | |
| --- | --- | --- | --- | --- | --- | --- | --- | --- | --- |
|  | II-6 | II-7 | II-8 | II-8 | II-9 | II-10 | II-11 | II-12 | II-13 |
| Fron 11 | 32 | 36 | 40 | 36 | 40 | 44 | 36 | 40 | 44 |
| Sumidur 44V-20[7] | 148 | 148 | 148 | 148 | 148 | 148 | 148 | 148 | 148 |
| Reactivity | | | | | | | | | |
| Cream time (seconds) | 14 | 11 | 12 | 17 | 16 | 16 | 16 | 15 | 15 |
| Gel time (seconds) | 62 | 59 | 60 | 59 | 56 | 58 | 62 | 57 | 62 |
| Physical properties | | | | | | | | | |
| Density (kg/m$^3$) | 23.7 | 22.5 | 21.7 | 25.7 | 24.3 | 22.9 | 26.1 | 24.6 | 23.3 |
| Thermal conductivity (kcal/m · hr · °C.) | 0.0154 | 0.0152 | 0.0149 | 0.0136 | 0.0134 | 0.0138 | 0.0139 | 0.0139 | 0.0141 |
| Compressive strength (g/cm$^2$) | 1.66 | 1.57 | 1.61 | 2.51 | 2.14 | 1.77 | 1.93 | 1.72 | 1.44 |

Note)
[6] A polyol manufactured by Takeda Chemical Industries, Ltd., (OH value: 460, viscosity: 8000 cps.)
[7] A crude MDI manufactured by Sumitomo Bayer Urethane Co., Ltd.

Examples II-9 and 10, And Comparative Examples II-14 Through 17

Using the polyols prepared in Example I-3 and Comparative Example I-4, urethane foams were produced in the same manner as above. The results are shown in Table 5.

Compared with Comparative Examples II-14 and -15, Example II-9 and -10 showed definite savings in fron requirements.

Furthermore, the urethane foam of Comparative Example II-17 after curing could not be easily withdrawn from the molding box and when forced out, showed large cracks and marked internal scorching. The polyol of Comparative Example I-4, the starting material of this foam, was useless, for it was so reactive that the catalyst could not be used and the reaction was not controllable.

In Comparative Example II-18, the proportion of OTD polyol was so small (25%) that the foam density could not be sufficiently reduced.

TABLE 6

|  | Examples | Comparative Examples | |
| --- | --- | --- | --- |
|  | II-11 | II-18 | II-19 |
| Component (parts) | | | |
| Polyol of Example I-2 | 60 | 30 | — |
| Actcol GR-84 | 40 | 70 | 100 |
| Silicone B-8404 | 1.5 | 1.5 | 1.5 |
| H$_2$O | 1.5 | 1.5 | 1.5 |
| Kaolizer No. 1 | 1.6 | 2.8 | 4.0 |
| Fron-11 | 40 | 40 | 40 |
| Millionate MR-200 | 148 | 148 | 148 |
| Reactivity | | | |
| Cream time (seconds) | 10 | 13 | 15 |
| Gel time (seconds) | 58 | 60 | 57 |
| Physical property | | | |
| Foam density (kg/m$^3$) | 22.6 | 24.3 | 24.6 |

TABLE 5

|  | Examples | | Comparative Examples | | | |
| --- | --- | --- | --- | --- | --- | --- |
|  | II-9 | II-10 | II-14 | II-15 | II-16 | II-17 |
| Component (parts) | | | | | | |
| Polyol of Production Example I-3 | 100 | 100 | | | | |
| Actcol GR-84 | | | 100 | 100 | 100 | |
| Polyol of Comparative Example I-4 | | | | | | 100 |
| Silicone B-8404 | 1.5 | | 1.5 | | | 1.5 |
| Kaolizer No. 1 | 0.3 | 0.5 | 3.0 | 3.3 | 3.5 | 0 |
| Fron-11 | 37 | 43 | 40 | 44 | 48 | 38 |
| Millionate MR-200 | 132 | 132 | 123 | 123 | 123 | 142 |
| Reactivity | | | | | | |
| Cream time (seconds) | 14 | 17 | 30 | 32 | 29 | 17 |
| Gel time (seconds) | 60 | 62 | 90 | 87 | 86 | 78 |
| Physical properties of foam | | | | | | |
| Density (kg/m$^3$) | 27.8 | 26.2 | 30.5 | 28.3 | 27.3 | Crack, marked scorch |
| Thermal conductivity (kcal/m · hr · °C.) | 0.0142 | 0.0138 | 0.0135 | 0.0136 | 0.0135 | |
| Compressive strength (g/cm$^2$) | 2.49 | 2.57 | 2.78 | 2.54 | 2.37 | |

Example II-11 And Comparative Example II-18 And 19

The polyol of Example I-2 was blended with a different polyol to prepare polyol mixtures and using the mixtures, urethane foams were produced. The results are shown in Table 6. It is apparent from Table 6 that the polyol mixture containing at least a certain amount of the polyol of Example I-2 was effective in reducing the density of urethane foam. In Example II-11, the proportion of the polyol of Example I-2 (OTD polyol) was 52%.

Reference Example

Using the polyol of Example I-2 and Actcol GR-84, urethane foams were produced according to the formulas shown in Table 7. The temperature that developed during the foaming reaction was measured with a thermocouple inserted into the foaming material. The $CO_2$ (%) value was determined as follows. The product urethane foam was cut and vacuum-packed in an aluminum foil-laminated bag, which was compressed and heated to 60° C. Then, using a microsyringe, the gas in the bag was sampled and the $CO_2$/fron ratio was determined by the gas chromatographic method. The results are shown in Table 7. Foam A contained a greater amount of $CO_2$ than foam B and showed a higher maximum reaction temperature. These results suggested the evolution of $CO_2$ due to some side reaction.

TABLE 7

|  | Test Examples | |
| --- | --- | --- |
|  | A | B |
| Component (parts) | | |
| Polyol of Example I-2 | 100 | |
| Actcol GR-84 | | 100 |
| Silicone B-8404 | 1.5 | 1.5 |
| $H_2O$ | 1.5 | 1.5 |
| Kaolizer No. 1 | 0.6 | 3.2 |
| Fron-11 | 40 | 40 |
| Millionate MR-200 | 148 | 148 |
| Reactivity | | |
| Cream time (seconds) | 13 | 16 |
| Gel time (seconds) | 59 | 61 |
| Physical property of foam | | |
| Density (kg/m$^3$) | 22.2 | 24.8 |
| Max. temperature (°C.) | 165 | 152 |
| $CO_2$ (%) | 76 | 50 |

What is claimed is:

1. A polyether polyol which is prepared by
   (i) reacting 3.0 to 4.0 molecular equivalents of ethylene oxide with one molecular equivalent of 2,3- or 3,4-tolylenediamine, or a mixture thereof in the absence of catalyst, and thereafter,
   (ii) reacting 2.8 to 4.8 molecular equivalents of propylene oxide with one molecular equivalent of the reaction product of (i) in the presence of an alkali metal hydroxide in an amount of not more than 0.8% by weight based on the 2,3- or 3,4-tolylenediamine, or the mixture thereof.

2. A polyether polyol according to claim 1, wherein the alkali metal hydroxide is potassium hydroxide.

3. A rigid polyurethane foam which is prepared by reacting a polyol mixture containing
   (a) not less than 50% by weight of polyether polyol having a hydroxyl value of 390 to 530 mgKOH/g according to claim 1, and
   (b) 0 to 50% by weight of polyol having two to eight hydroxyl groups,
with an isocyanate in the presence of a foaming agent, foam stabilizer and catalyst.

4. A rigid polyurethane foam according to claim 3, wherein 1.0 to 3.0 parts by weight of water is used as a foaming agent for 100 parts by weight of polyol, and the rigid polyurethane foam has a free foaming density of 20 to 36 kg/m$^3$.

5. A rigid polyurethane foam according to claim 3, wherein the polyol mixture has a hydroxyl value of 380 to 650 mgKOH/g.

* * * * *